US011912526B2

(12) United States Patent
Taylor, II

(10) Patent No.: US 11,912,526 B2
(45) Date of Patent: Feb. 27, 2024

(54) SQUEEGEE AND METHOD FOR APPLYING TINTING FILM

(71) Applicant: Peyton C. Taylor, II, Silver Spring, MD (US)

(72) Inventor: Peyton C. Taylor, II, Silver Spring, MD (US)

( * ) Notice: Subject to any disclaimer, the term of this patent is extended or adjusted under 35 U.S.C. 154(b) by 0 days.

(21) Appl. No.: 17/505,742

(22) Filed: Oct. 20, 2021

(65) Prior Publication Data

US 2022/0127101 A1 Apr. 28, 2022

Related U.S. Application Data

(60) Provisional application No. 63/094,956, filed on Oct. 22, 2020.

(51) Int. Cl.
| | |
|---|---|
| *B65H 37/04* | (2006.01) |
| *B32B 37/10* | (2006.01) |
| *B32B 37/18* | (2006.01) |
| *G02B 1/10* | (2015.01) |

(52) U.S. Cl.
CPC ............ *B65H 37/04* (2013.01); *B32B 37/10* (2013.01); *B32B 37/18* (2013.01); *B32B 2307/402* (2013.01); *B32B 2605/00* (2013.01); *G02B 1/10* (2013.01)

(58) Field of Classification Search
CPC . G02B 1/10; B32B 2605/00; B32B 2307/402; B32B 37/18; B32B 37/10; B65H 37/04
See application file for complete search history.

(56) References Cited

U.S. PATENT DOCUMENTS

| | | | |
|---|---|---|---|
| 4,893,369 | A | 1/1990 | Johnson |
| 5,406,671 | A | 4/1995 | Green |
| 8,832,898 | B1 | 9/2014 | Stimach |
| 2007/0071540 | A1 | 3/2007 | Jung |
| 2010/0011527 | A1 | 1/2010 | Lawlor |

OTHER PUBLICATIONS https://www.youtube.com/watch?v=FPCInZPXeX8 Date: Sep. 7, 2018.*
https://actionengineering.com/badass-manual-squeegee/ Year: 2023.*
https://www.youtube.com/watch?v=mYKctlpavlc Date: Jul. 16, 2016.*

* cited by examiner

*Primary Examiner* — Vishal I Patel
(74) *Attorney, Agent, or Firm* — Edell, Shapiro & Finnan, LLC

(57) ABSTRACT

An improved squeegee includes two parallel handles secured to a base serving as a blade receiving member. The handles are secured at spaced locations on opposite sides of the longitudinal center of the blade, spaced from the blade ends. A technician can grasp each handle with a respective hand and simultaneously apply forces to the squeegee blade at two spaced locations during wiping strokes so that those forces are evenly distributed along the blade length. The distribution of forces along the length of a squeegee blade permit the use of longer squeegee blades without sacrificing effective squeegee functionality.

9 Claims, 5 Drawing Sheets

SQUEEGEE AND METHOD FOR APPLYING TINTING FILM

CROSS REFERENCE TO RELATED APPLICATIONS

This application is a non-provisional application claiming priority from U.S. Provisional Application No. 63/094,956, entitled "Improved Squeegee and Method For Applying Tinting Film To Windows", and filed Oct. 22, 2020, the disclosure in which is incorporated in its entirety herein by this reference.

TECHNICAL FIELD

The disclosure pertains generally to improved squeegee devices and methods of their use and, more particularly, to such devices and methods employed in applying tinting films, and the like, to windows.

BACKGROUND OF THE DISCLOSURE

The process of applying window tint to a window typically requires spraying a soapy water solution onto the previously cleaned window surface and then placing a tint film on the soapy water surface of the window so that the tint film covers the entire window surface area. Thereafter, a squeegee or similar tool is pressed onto and moved along the applied film to push air bubbles and soapy water solution that are trapped between the film and window to the edges of the film in order to remove them while also removing wrinkles and creases so that the tint film is pressed perfectly smooth against the window surface.

Typical squeegees used by technicians in applying tint films to windows comprise wiper blades having lengths of approximately eight inches secured in a channel of an elongate blade receiving member. A handle is secured at or proximate the longitudinal center of a blade receiving member so as to extend perpendicularly therefrom. In use, the handle is grasped by the technician who forcefully pushes the squeegee to force the applied film against the window while moving the blade in strokes from side to side and up and down on the film surface. The number of such strokes required to effect installation of the film is determined by the length of the blade; that is, the shorter the blade the more strokes are required to smooth the affected area.

It is evidently advantageous to a technician to minimize the amount of time required to apply a tinting film to a window, and one way to accomplish that would be to increase the length of the squeegee blade, thereby reducing the number of strokes required for a given window area. As the blade length is increased, however, at some point the added length becomes counterproductive. More particularly, it is understandable that the force applied by the technician normal to plane of the window at any point along the blade decreases as a function of blade distance from the blade center, i.e., the handle location where the force is maximum. If the blade length is increased, at some point along the blade length the force becomes insufficient to effectively smooth the creases and clear the liquid and air bubbles trapped between the film and window during an application stroke. In some cases, the force is reduced to the point where encountering a crease in the film, or differences in friction experienced by the two blade segments on opposite sides of the blade center, causes the blade to inadvertently skew or rotate about the blade center during a stroke.

It would be desirable, therefore, to increase the lengths of squeegee blades, and thereby minimize the number of strokes required to complete a tinting film installation, without experiencing the problems described above.

SUMMARY

This Summary is provided to introduce concepts in a simplified form that are further described below in the Detailed Description. This Summary is not intended to identify key features or essential features of the claimed subject matter, nor is it intended as an aid in determining the scope of the claimed subject matter.

A technique for permitting the lengths of squeegee blades to be increased is disclosed herein and comprises providing a squeegee with two parallel handles secured to a base serving as a blade receiving member, the handles being attached to the base at spaced locations along the blade length on opposite sides of the longitudinal center of the blade. As a result, a technician can grasp each handle with a respective hand and simultaneously apply perpendicularly directed forces to the squeegee at two spaced locations during a stroke so that those forces are more evenly distributed along the blade length. Otherwise stated, disclosed herein is a structure and method for more evenly distributing the perpendicularly directed forces applied by a technician along the length of a squeegee blade to permit the use of longer squeegee blades without sacrificing effective squeegee functionality.

More specifically, disclosed herein is a squeegee comprising an elongate base member having left and right ends and a longitudinal center, an elongate blade secured to the base member and having an edge protruding forwardly from the base member, and left and right handles secured to and extending rearwardly from the base member at respective longitudinally spaced locations such that the left handle is secured at a first location between the left end and longitudinal center of the base member, and the right handle is secured at a second location between the right end and longitudinal center of the base member. In one embodiment the first location is spaced from the left end by approximately 25% of the length of the base member, and the second location is spaced from the right end by approximately 25% of the length of the base member. In a preferred embodiment: the base member comprises a top member and a bottom member secured to and substantially coextensive with the top member, wherein the blade is engaged by and between the top member and bottom member; the top member and bottom member are removably secured to one another to permit replacement of the blade; and the handles and top member comprise an integrally molded member.

BRIEF DESCRIPTION OF THE DRAWINGS

By way of example, a specific embodiment of the disclosed device is described with reference to the accompanying drawings, in which.

DETAILED DESCRIPTION OF THE DRAWINGS

Figure 1:
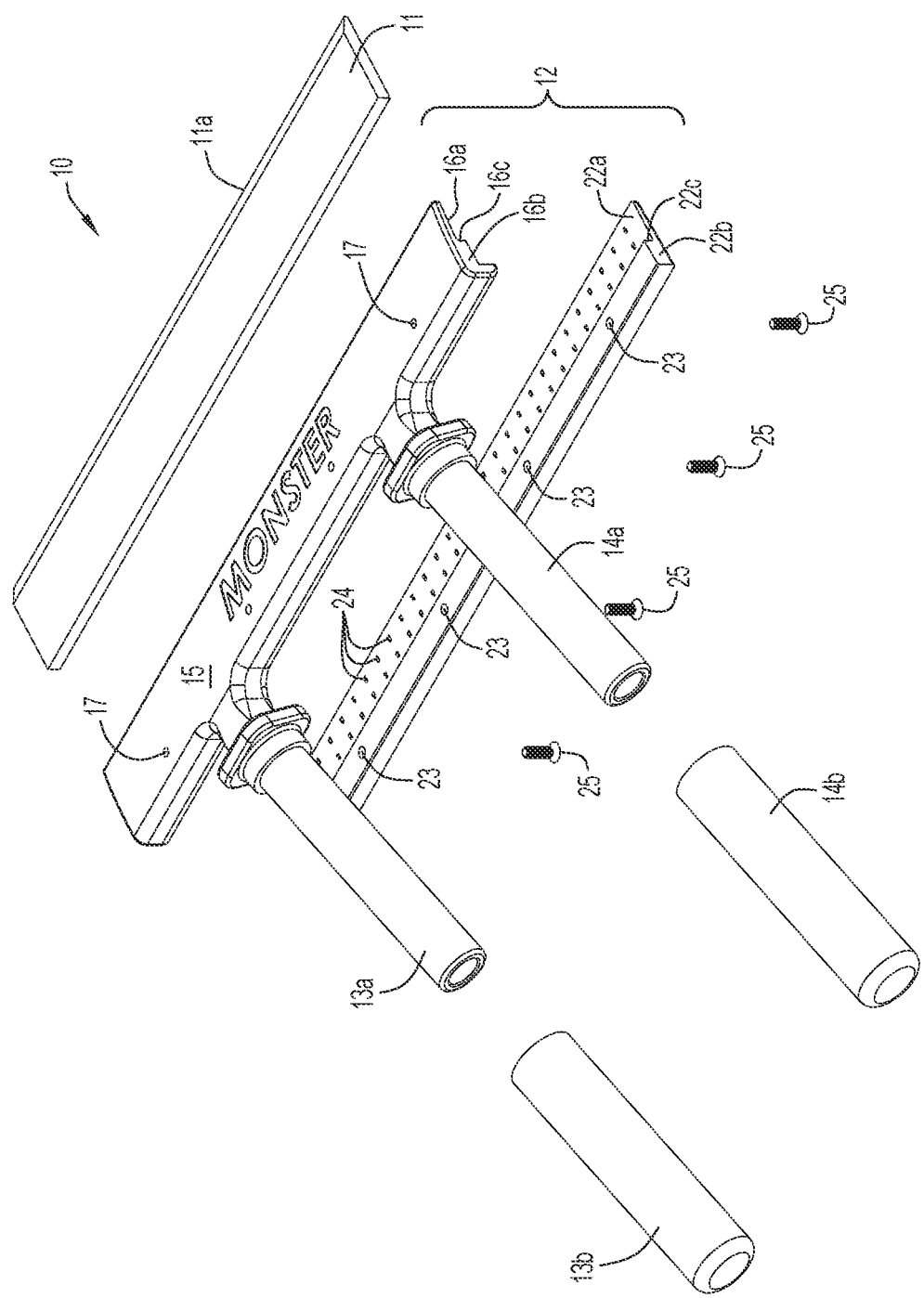
FIG. 1 is an exploded view in perspective of an embodiment of a squeegee assembly in accordance with the present disclosure.
Figure 2:
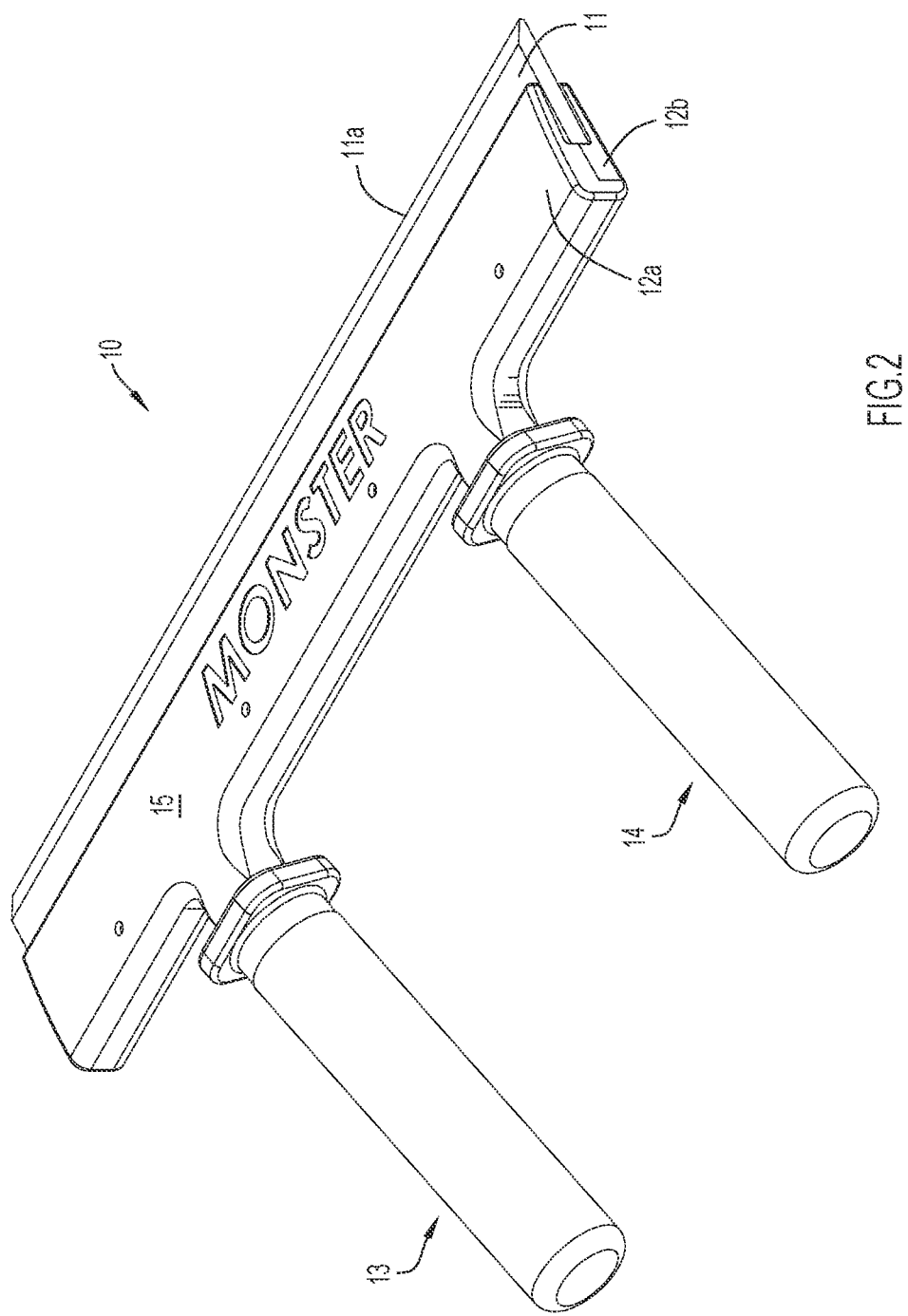
FIG. 2 is a view in perspective from above of the squeegee assembly of FIG. 1.
Figure 3:
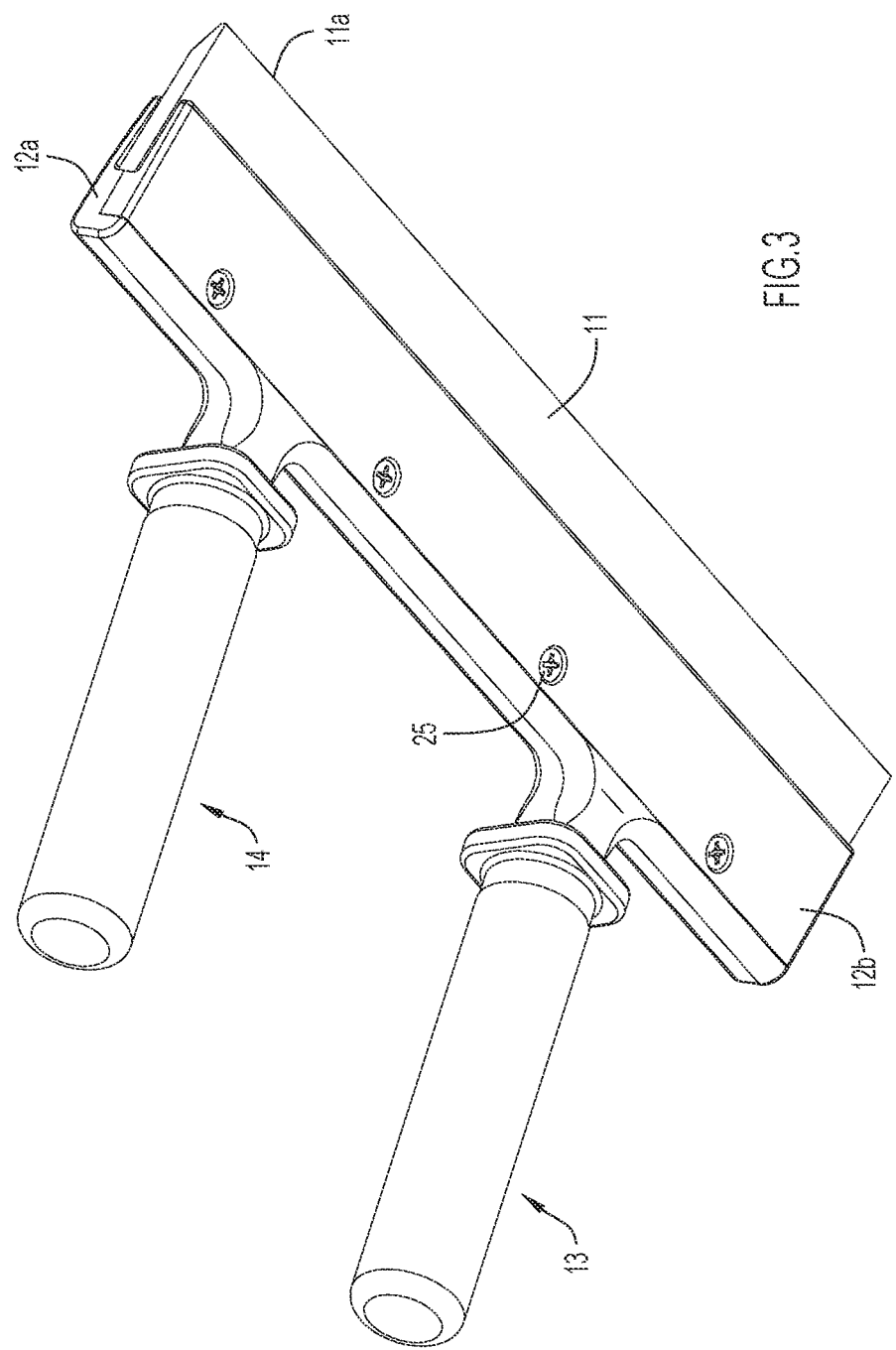
FIG. 3 is a view in perspective from below of the squeegee assembly of FIG. 1.
Figure 4:
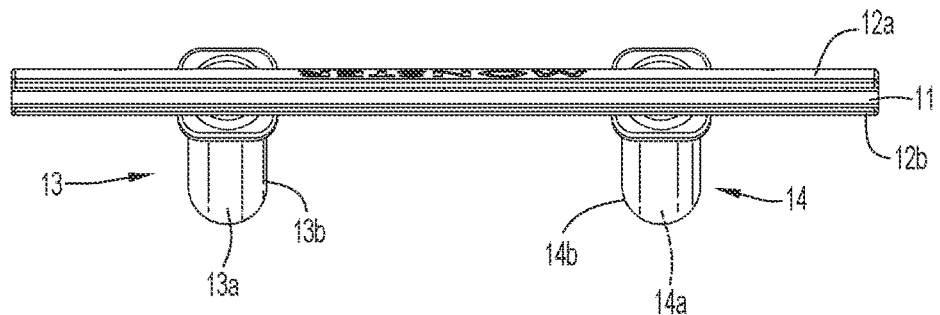
FIG. 4 is a front view in elevation of the squeegee assembly of FIG. 1.
Figure 5:
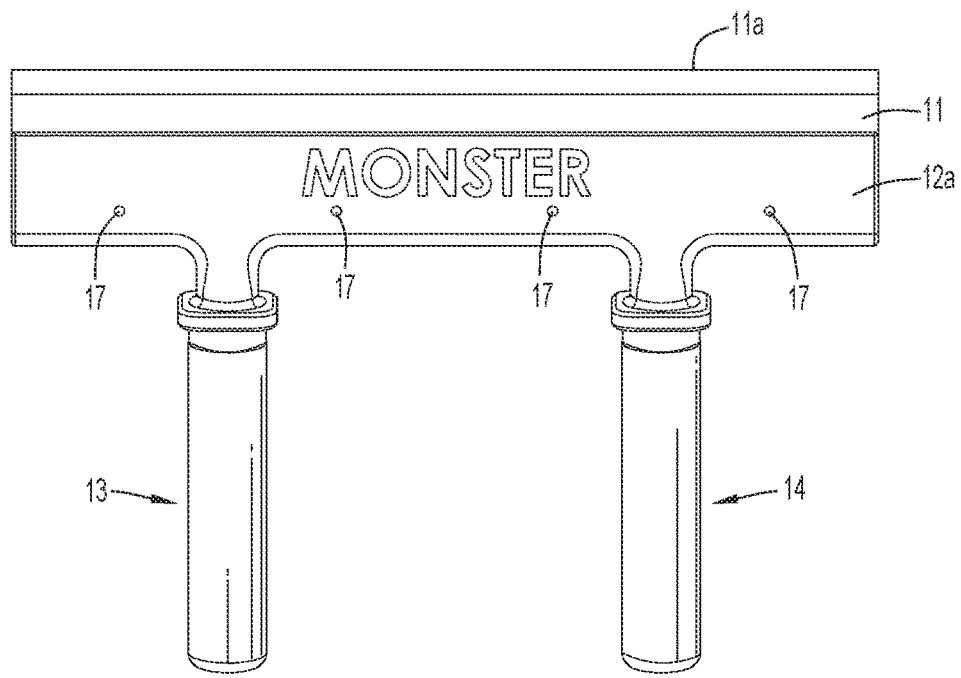
FIG. 5 is a top view in plan of the squeegee assembly of FIG. 1.
Figure 6:
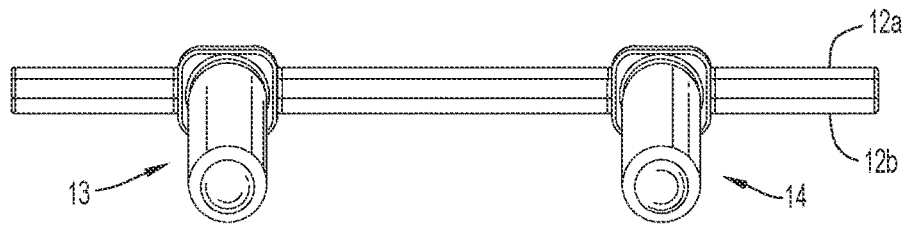
FIG. 6 is a rear view in elevation of the squeegee assembly of FIG. 1.
Figure 7:
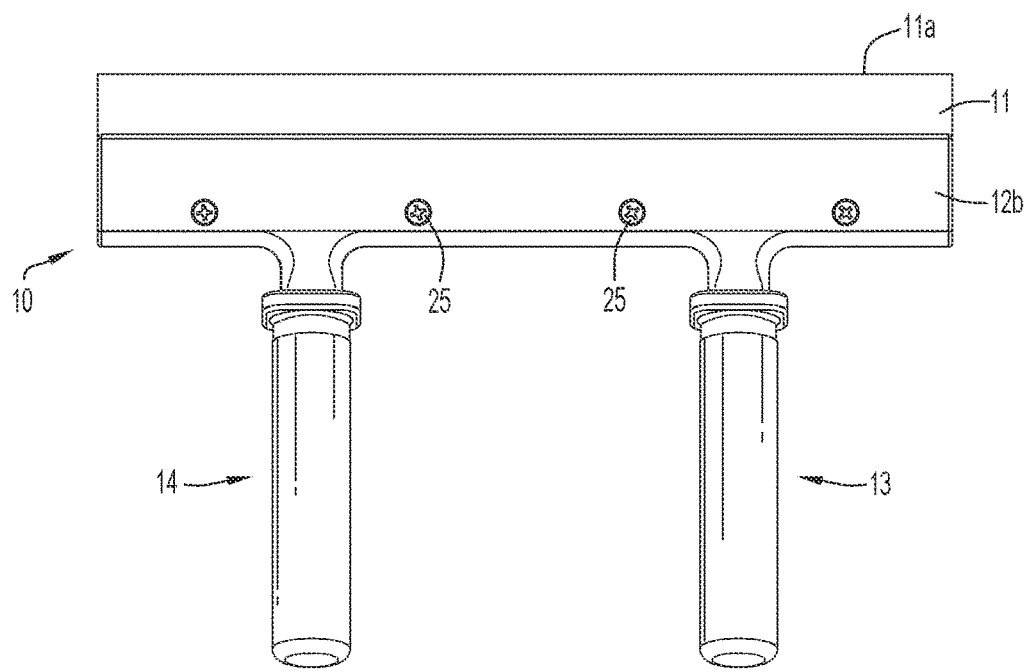
FIG. 7 is a bottom view in plan of the squeegee assembly of FIG. 1.

The present embodiment is described more fully hereinafter with reference to the accompanying drawings, in which an exemplary embodiment is shown. It will be readily understood that the components of the embodiment as generally described herein and illustrated in the appended figures could be arranged and designed in a wide variety of different configurations. Thus, the following more detailed description of a preferred embodiment, as represented in the figures, is not intended to limit the scope of the present disclosure, but is merely representative of various embodiments. While the various aspects of the embodiment are presented in drawings, the drawings are not necessarily drawn to scale unless specifically indicated.

The concepts presented herein may be embodied in other specific forms without departing from their spirit or essential characteristics. The described embodiment is to be considered in all respects only as illustrative and not restrictive. The scope of the disclosure is, therefore, indicated by the appended claims rather than by this detailed description. All changes which come within the meaning and range of equivalency of the claims are to be embraced within their scope.

The described features, advantages, and characteristics of the disclosed concepts may be combined in any suitable manner in one or more embodiments. One skilled in the relevant art will recognize, in light of the description herein, that the concepts can be practiced without one or more of the specific features or advantages. In other instances, additional features and advantages may be recognized that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

The terms "upper", "top", "lower", "bottom", "vertical", "horizontal", etc., are used herein only to refer to an arbitrary orientation of the squeegee for convenience of the following description and are not intended to otherwise limit the structures described and claimed.

Referring more specifically to the accompanying drawings, a squeegee 10 is shown with an elongate wiper blade 11 secured in parallel relation to a longitudinally extending rigid blade-receiving base 12 from which two handles 13 and 14, of substantially equal length and configuration, extend perpendicularly and rearwardly of the base and blade. Importantly, the mutually parallel handles extend from respective locations that are substantially equally spaced in opposite directions from the longitudinal center of base 12. In the disclosed embodiment base 12 comprises substantially co-extending top member 12a and bottom member or clamp 12b between which blade 11 is sandwiched so that the tapered forward edge 11a of the blade projects forwardly of the base.

The handles 13 and 14 extend rearwardly from the rear edge of top member 12a at respective locations that are longitudinally spaced from one another and from respective ends of the top member. In the preferred embodiment shown in the drawings, each handle extends from a respective location along top member 12a that is substantially midway between a respective end and the longitudinal center of base 12. In other words, the right handle 14 is spaced from the right end of the base by approximately 25% of the length of base, and the left handle 13 is spaced from the left end of the base by approximately 25% of the length of the base. This spacing achieves optimal distribution along the blade of normal forces applied by a technician to both handles during a squeegee stroke. It will be appreciated, however, that other spacing between the handles may be utilized, depending on the application and use of the squeegee.

Handles 13 and 14 comprise respective cylindrical tubes 13a and 14a that are preferably formed integrally with top member 12a and may be circumferentially surrounded by respective gripping sleeves 13b and 14b that may be secured by adhesive or the like to their respective tubes.

Top member 12a has a substantially flat or planar top surface 15 and a bottom surface 16 having a forward area, a rearward area, and an intermediate shoulder 16c, all extending along the entire length of the top member. Shoulder 16c serves as step transition between the forward and rearward areas and results in top member 12a having a relatively thin forward section 16a and a thicker rearward section 16b. A plurality of tapped holes 17 extend perpendicularly through rearward section 16b and are arranged in a linear array along the length of base 12. Multiple friction nubs 18 protrude downward from forward section 16a and are arranged in two parallel rows extending along the length of the top member. The forward edge of top member 12a is beveled and serves as a smooth transition between surfaces 15 and 16.

Clamp 12b has a substantially flat or planar bottom surface 21 and a top surface 22 having a forward area, a rearward area, and an intermediate shoulder 22c, all extending along the entire length of the clamp. Shoulder 22c serves as step transition between the forward and rearward areas and results in clamp 12b having a relatively thin forward section 22a and a thicker rearward section 22b. A plurality of recessed bores or holes 23 extend through rearward section 16b and are arranged in a linear array along the length of the clamp. Multiple friction nubs 24 protrude from forward section 22a and are arranged in two parallel rows extending along the length of the clamp. The forward edge of the clamp is beveled and serves as a smooth transition between the surfaces 21 and 22.

In the assembled base 12 the bottom surface 16 of top member 12a faces similarly configured top surface 22 of clamp 12b with rearward sections 16b and 22b in abutting relation and each tapped hole 17 aligned with a respective bore 23. In addition, shoulders 16c and 22c are coplanar to define a forward facing stop or ledge, and the surfaces of forward sections 16a and 22a face one another in substantially parallel spaced relation. Top member 12a and clamp 12b are joined together by means of flat head screws 25 inserted through recessed bores 23 in the clamp to threadedly engage tapped holes 17 in top member 12a. The space between the forward sections 16a and 22a defines a gap coextensive with those sections that receives similarly coextensive blade 11 interposed between the forward sections such the rear edge of the blade linearly abuts the stop defined by aligned shoulders 16c and 22c. In this position the blade is frictionally engaged to be firmly held in place by the opposing arrays of friction nubs 18 and 24 and with forward blade edge 11a protruding forwardly from the gap.

In use, a technician, when applying a tinting film to a window pane or performing a similar function, grasps handles 13 and 14 in respective hands and pushes the forward edge 11a of the blade against the surface being treated while scraping the blade edge along that surface with two-handed wiping strokes. The forces applied axially to the handles should preferably be substantially equal to optimize even force distribution to the treated surface, a function that is facilitated by the ergonomically designed equal lengths of the handles.

In the preferred embodiment the top member 12a and handles 13, 14 are part of an integrally molded member of ABS or other suitable thermoplastic material. Clamp 12b is preferably made from the same material as the top member. If desired, these parts may alternatively be formed from cast metal or carved wood. In any event, the handles must be rigidly connected to the base 12 during use of the squeegee 10 to assure efficient two-handed application of forces from the handles to the squeegee blade. In addition, it is important that the assembled base member 12 is a rigid member to permit forces applied thereto via the handles to be distributed evenly along the blade length; that is, foldable or bendable base members are counterproductive to the intended purpose of squeegee 10.

Blade 11 is generally rectangular and made from typical material used for squeegee blades, e.g., hard or soft rubber, premium rubber, plastic such as urethane or Teflon, silica reinforced rubber, etc., or any other material for controllably applying pressure to the tinting film being applied. The blade may extend a short distance lengthwise beyond the ends of the base. In such a case it is important that the blade material be sufficiently rigid so that its two half sections extending from its longitudinal center cannot flex or bend about an axis transverse to the blade when force is applied through the handles during use of device. The blade may be replaced or removed for cleaning by simply removing screws 25 to disengage the top member 12a from clamp 12b and removing the blade.

As shown and described for the preferred embodiment, the handles 13, 14 and top member 12a are preferably formed as an integral member. Alternatively, the handles may be formed separately from the base so as to be selectively attachable to the base by threaded engagement, snap fit, or other conventional fastener means. The shape and material of the handles should be ergonomically chosen to facilitate firm comfortable gripping by a technician when the squeegee is in use. Typically, the handles would be generally cylindrical and have a length of between four and seven inches, but such shape and length are not limiting features of the disclosed device. In the preferred embodiment the handles are parallel to one another; however, it is to be understood that the handles may extend in a slightly mutually convergent or divergent manner (e.g., 5° or less) if desired, and may have a very slight downward curvature (e.g., a radius of curvature of 10° or less) for ergonomic effectiveness.

From a dimensional perspective, in one example working embodiment the base and blade are approximately fourteen inches long and function without the disadvantages noted above that are inherent in single handled squeegees. It will be appreciated that, depending on the particular job and application, different length blades may be employed. In the described working example the width of the base and blade (i.e., from the rear edge of the base to the forward edge of the blade) is 2.8 inches, and the length of the handles is approximately 5.2 inches. These dimensions are provided for perspective only and are not intended to limit the scope of the disclosed concepts. However, handle length should be kept within a range of lengths that assure efficient operation of the device. Specifically, if the handles are too short to permit them to be gripped securely by a technician, application of sufficient and evenly applied force is compromised. If the handles are too long they become awkward to grip during use and thereby also compromise efficient and even force application.

Figure 8:
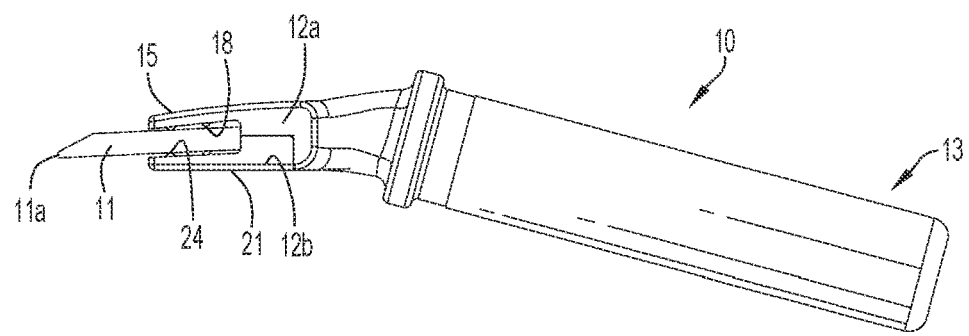
FIG. 8 is a left side view in elevation of the squeegee assembly of FIG. 1.
Figure 9:
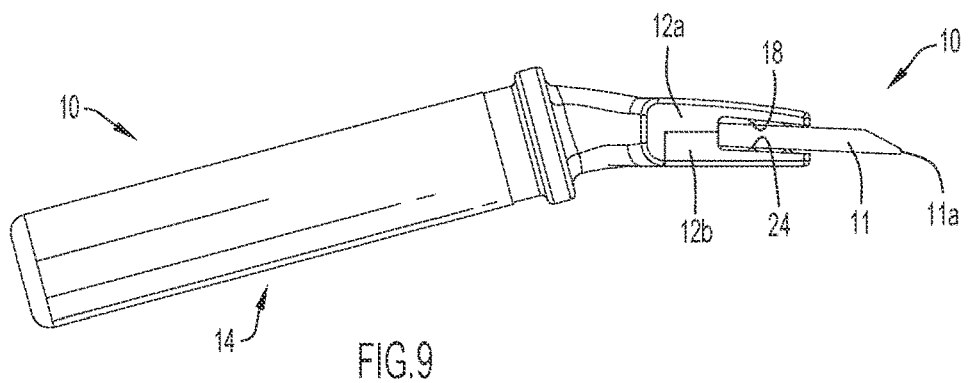
FIG. 9 is a right side view in elevation of the squeegee assembly of FIG. 1.

From an ergonomic perspective, and as best illustrated in FIGS. 8 and 9, the central axes of the parallel handles 13, 14 are preferably not coplanar with blade 11; rather, the handle axes extend downward from the plane of the blade by an angle of approximately 40°±10°. If the handle axes were coplanar with the blade, the technician would be required to apply awkwardly directed parallel forces perpendicularly to the blade through the axes of the handles.

Although the forward edge 11a of blade 11 may be linear, in many instances it preferably curves concavely slightly (e.g., a radius of curvature of approximately four or five degrees) so that it flexes slightly in response to applied forces to better distribute those forces evenly along the blade length.

As used herein, an element or operation recited in the singular and proceeded with the word "a" or "an" should be understood as not excluding plural elements or operations, unless such exclusion is explicitly recited.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:
1. A squeegee comprising:
an elongate base member having left and right ends and a longitudinal center;
an elongate blade secured to the base member and having a forward edge protruding forwardly from the base member;
left and right handles secured to and extending rearwardly from the base member at respective longitudinally spaced locations such that the left handle is secured at a first location between the left end and longitudinal center of the base member, and the right handle is secured at a second location between the right end and longitudinal center of the base member;
wherein the left and right handles extend substantially parallel to one another;

wherein the blade is substantially planar, and wherein the handles have respective longitudinal axes that are oriented at an angle of approximately 40°±10° relative to the plane of the blade;

wherein the base member is sufficiently rigid such that its two half sections extending from the longitudinal center of the blade member cannot flex or bend about an axis transverse to the blade when force is applied through the handles during use of squeegee;

wherein the base member comprises:
a top member and a bottom member secured to and substantially coextensive with the top member; and
wherein the blade is engaged by and between the top member and bottom member.

2. The squeegee of claim 1 wherein the top member and bottom member are removably secured to one another to permit replacement of the blade.

3. The squeegee of claim 2 wherein the handles and top member are parts of an integrally molded member.

4. The squeegee of claim 3:
wherein the top member has a bottom surface and the bottom member has a top surface facing the bottom surface of the top member in spaced relation to define a gap therebetween; and
wherein the blade is disposed in the gap.

5. The squeegee of claim 4 further comprising:
a first plurality of friction nubs extending downwardly from the bottom surface of the top member; and
a second plurality of friction nubs extending upwardly from the top surface of the bottom member;
wherein the blade is secured by and between the first and second pluralities of friction nubs.

6. A squeegee comprising:
an elongate base member having left and right ends and a longitudinal center;
an elongate blade secured to the base member and having a forward edge protruding forwardly from the base member;
left and right handles secured to and extending rearwardly from the base member at respective longitudinally spaced locations such that the left handle is secured at a first location between the left end and longitudinal center of the base member, and the right handle is secured at a second location between the right end and longitudinal center of the base member;
wherein the base member comprises:
a top member and a bottom member secured to and substantially coextensive with the top member;
wherein the blade is engaged by and between the top member and bottom member;
wherein the top member and bottom member are removably secured to one another to permit replacement of the blade; and
wherein the handles and top member are parts of an integrally molded member.

7. The squeegee of claim 6:
wherein the top member has a bottom surface and the bottom member has a top surface facing the bottom surface of the top member in spaced relation to define a gap therebetween; and
wherein the blade is disposed in the gap.

8. The squeegee of claim 7 further comprising:
a first plurality of friction nubs extending downwardly from the bottom surface of the top member;
a second plurality of friction nubs extending upwardly from the top surface of the clamp; and
wherein the blade is secured by and between the first and second pluralities of friction nubs.

9. The squeegee of claim 6 wherein the blade has length of at least approximately fourteen inches.

* * * * *